(12) United States Patent
Minamiguchi et al.

(10) Patent No.: US 10,259,489 B2
(45) Date of Patent: Apr. 16, 2019

(54) ELECTRIC STEERING CONTROL DEVICE

(71) Applicant: DENSO CORPORATION, Kariya, Aichi-pref. (JP)

(72) Inventors: Yuuichi Minamiguchi, Kariya (JP); Motoaki Kataoka, Kariya (JP); Yosuke Hirate, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 75 days.

(21) Appl. No.: 15/506,581

(22) PCT Filed: Aug. 21, 2015

(86) PCT No.: PCT/JP2015/004215
§ 371 (c)(1),
(2) Date: Feb. 24, 2017

(87) PCT Pub. No.: WO2016/031216
PCT Pub. Date: Mar. 3, 2016

(65) Prior Publication Data
US 2017/0253266 A1 Sep. 7, 2017

(30) Foreign Application Priority Data

Aug. 28, 2014 (JP) .................. 2014-174384

(51) Int. Cl.
*B62D 5/04* (2006.01)
*B62D 6/00* (2006.01)
*B62D 6/02* (2006.01)

(52) U.S. Cl.
CPC ............. *B62D 5/0463* (2013.01); *B62D 6/00* (2013.01); *B62D 6/008* (2013.01); *B62D 6/02* (2013.01)

(58) Field of Classification Search
CPC ......... B62D 5/0463; B62D 6/00; B62D 6/008
USPC ........................................................ 701/41
See application file for complete search history.

(56) References Cited

U.S. PATENT DOCUMENTS

2013/0060427 A1* 3/2013 Kataoka ............... B62D 5/0466
701/42

FOREIGN PATENT DOCUMENTS

JP 4161707 B2 10/2008
JP 2015-003549 A 1/2013

* cited by examiner

Primary Examiner — Isaac G Smith
(74) Attorney, Agent, or Firm — Knobbe, Martens, Olson & Bear, LLP

(57) ABSTRACT

An electric steering control device controls a steering characteristic by outputting an assist torque using a motor, and the assist torque corresponds to a detection value of a steering torque which is applied to a steering shaft. The electric steering control device includes a steering target value generation unit generating a target value of the steering torque based on a state amount estimated from the target value of the steering torque and the assist torque, a command value generation unit generating a command value for controlling the motor to reduce a deviation between the target value of the steering torque and the detection value of the steering torque to a level lower than a predetermined threshold, and a motor drive unit driving the motor based on the command value.

5 Claims, 7 Drawing Sheets

ELECTRIC STEERING CONTROL DEVICE

CROSS REFERENCE TO RELATED APPLICATION

This application is based on Japanese Patent Application No. 2014-174384 filed on Aug. 28, 2014, the disclosure of which is incorporated herein by reference.

TECHNICAL FIELD

The present disclosure relates to an electric steering control device that controls a steering characteristic by outputting an assist torque corresponding to a steering torque applied to a steering shaft by the aid of a motor.

BACKGROUND ART

As one type of the electric steering control devices, an electric steering control device that obtains a target value of a steering torque based on a sum of a detection value of the steering torque and a detection value of an assist torque obtained from a motor current value, and drives a motor so as to reduce a difference between the target value and the detection value of the steering torque, to thereby generate the assist torque has been known (refer to Patent Literature 1).

PRIOR ART LITERATURE

Patent Literature

[Patent Literature 1] JP 4161707 B2

SUMMARY OF INVENTION

Usually, noise is superimposed on the detection value of the steering torque. Thus, when the target value of the steering torque is set on the basis of the detection value of the steering torque so as to control the motor, the noise adversely affects the control of the motor, resulting in such a problem that, for example, vibration. In addition, since the detection value of the steering torque results from the driver's operation, the control based on the detection value of the steering torque is a follow-up control, and therefore responsiveness of the control is low.

In view of the foregoing difficulties, it is an object of the present disclosure to provide an electric steering control device capable of improving robustness to the noise of a steering system and responsiveness of control.

According to an aspect of the present disclosure, an electric steering control device controls a steering characteristic by outputting an assist torque using a motor, and the assist torque corresponds to a detection value of a steering torque which is applied to a steering shaft. The electric steering control device includes a steering target value generation unit generating a target value of the steering torque based on a state amount estimated from the target value of the steering torque and the assist torque, a command value generation unit generating a command value for controlling the motor to reduce a deviation between the target value of the steering torque and the detection value of the steering torque to a level lower than a predetermined threshold, and a motor drive unit driving the motor based on the command value.

In other words, as compared with the conventional art, the target value of the steering torque used for the subsequent control is set by the use of the target value of the steering torque on which no noise is superimposed instead of the detection value of the steering torque.

According to the above electric steering control device, the robustness to the noise of the steering system and the responsiveness can be improved.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, embodiments of the present disclosure will be described with reference to the drawings.

First Embodiment

Figure 1:
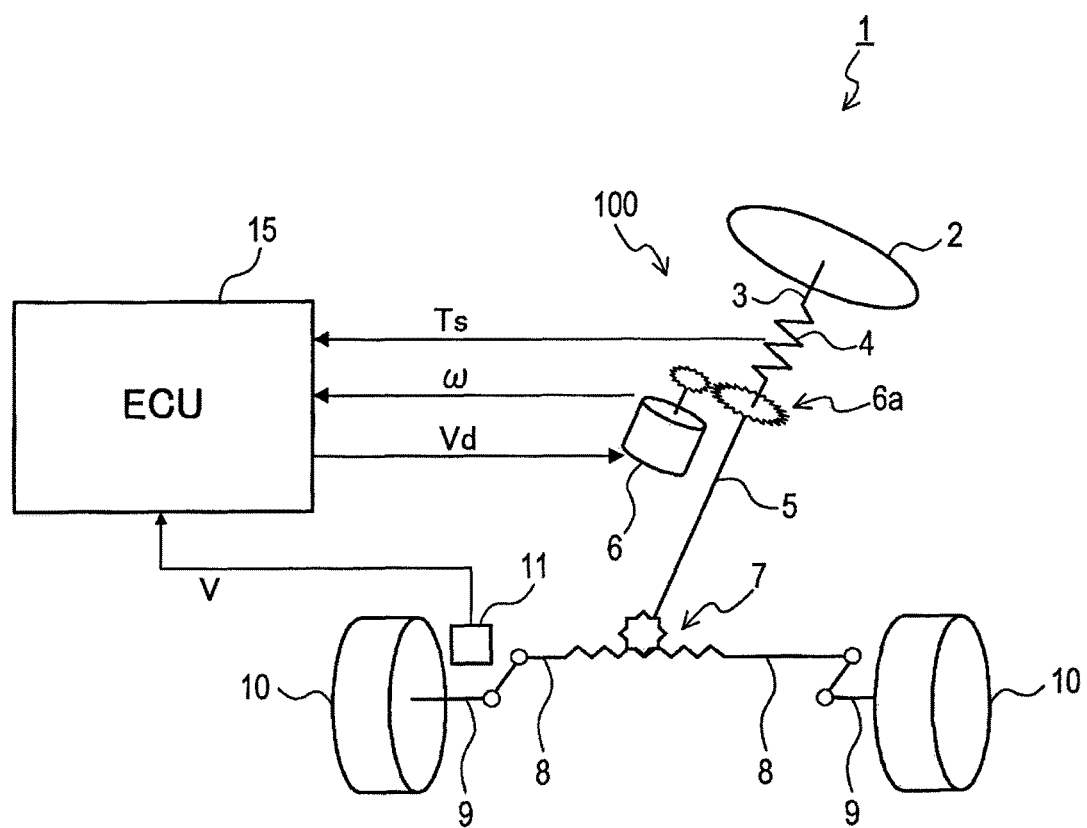
FIG. 1 is a diagram illustrating a schematic configuration of an electric power steering system.

As illustrated in FIG. 1, an electric power steering system 1 according to the present embodiment assists the driver's operation of a steering wheel 2 by the aid of a motor 6. The steering wheel 2 is fixed to one end of a steering shaft 3, the other end of the steering shaft 3 is connected with a torque sensor 4, and the other end of the torque sensor 4 is connected with an intermediate shaft 5. In the following description, the entire shaft extending from the steering shaft 3 to the intermediate shaft 5 through the torque sensor 4 is collectively referred to as "steering shaft".

The torque sensor 4 is a sensor for detecting a steering torque Ts. Specifically, the torque sensor 4 includes a torsion bar that couples the steering shaft 3 with the intermediate shaft 5, and detects a torque applied to the torsion bar on the basis of a torsion angle of the torsion bar.

The motor 6 assists a steering force of the steering wheel 2, and a rotation of the motor 6 is transmitted to the intermediate shaft 5 through a speed reduction mechanism 6a. In other words, the speed reduction mechanism 6a includes a worm gear provided on a distal end of a rotary shaft of the motor 6, and a worm wheel coaxially disposed in the intermediate shaft 5 in a state to be meshed with the worm gear. With the above configuration, the rotation of the motor 6 is transmitted to the intermediate shaft 5. Conversely, when the intermediate shaft 5 is rotated by the operation of the steering wheel 2 or a reaction force (road surface reaction force) from a road surface, the rotation of the intermediate shaft 5 is transmitted to the motor 6 through the speed reduction mechanism 6a, and the motor 6 is also rotated.

In the present embodiment, the motor 6 is a brushless motor, and internally includes a rotation sensor such as a resolver so as to output a rotation state of the motor 6. The motor 6 according to the present embodiment can output at least a motor speed w (information indicative of a rotation angular speed which will be hereinafter dealt with as a rotational speed of the steering shaft) as the rotation state from the rotation sensor.

One end of the intermediate shaft 5 is connected with the torque sensor 4, and the other end of the intermediate shaft 5 is connected with a steering gear box 7 on opposite side. The steering gear box 7 is configured by a gear mechanism having a rack and a pinion gear, and teeth of the rack is meshed with the pinion gear disposed on the other end of the intermediate shaft 5. For that reason, when the driver rotates the steering wheel 2, the intermediate shaft 5 is rotated (that is, the pinion gear is rotated), to thereby move the rack horizontally.

Respective tie rods 8 are fitted to both ends of the rack, and the tie rods 8 reciprocate horizontally together with the rack. As a result, the tie rods 8 push or pull respective knuckle arms 9 at tips of the tie rods 8, to thereby change an orientation of respective tires 10 of steering wheels. In addition, a predetermined portion of the vehicle is equipped with a vehicle speed sensor 11 for detecting a vehicle speed V.

With the above configuration, when the driver rotates (steers) the steering wheel 2, the rotation of the steering wheel 2 is transmitted to the steering gear box 7 through the steering shaft 3, the torque sensor 4, and the intermediate shaft 5. The rotation of the intermediate shaft 5 is converted into a horizontal movement of the tie rods 8 within the steering gear box 7, and both of the right and left tires 10 are steered by the movement of the tie rods 8.

An ECU 15 operates with an electric power from a vehicle battery not shown, and calculates an assist torque command Ta on the basis of a steering torque Ts detected by the torque sensor 4, a motor speed ω of the motor 6, and the vehicle speed V detected by the vehicle speed sensor 11, The ECU 15 applies a drive voltage Vd corresponding to a calculated result to the motor 6. With the applying of the drive voltage Vd to the motor, the ECU 15 controls the amount of assist force in order to assist driver's force for rotating the steering wheel 2 (further a force for steering both of the tires 10).

In the present embodiment, because the motor 6 is a brushless motor, the drive voltage Vd output (supplied) from the ECU 15 to the motor 6 includes three component voltages Vdu, Vdv, and Vdw corresponding to three phases (U, V, W) in detail. When the drive voltages Vdu, Vdv, and Vdw corresponding to respective phases are applied (drive currents for the respective phases are supplied) from the ECU 15 to the motor 6, the rotation torque of the motor 6 is controlled by the applied voltages. A method of driving (for example, PWM driving) the brushless motor with the drive voltages of three phases and a driving circuit (for example, three-phase inverter) for generating the drive voltages of three phases are well known, and therefore detailed description will be omitted.

The ECU 15 controls the motor 6 by directly controlling the drive voltage Vd to be applied to the motor 6. With the control of the motor 6, the ECU 15 resultantly controls a steering system mechanism 100 driven by the motor 6. Hence, a target to be controlled by the ECU 15 is the steering system mechanism 100. The steering system mechanism 100 illustrated in FIG. 1 indicates an overall mechanism except for the ECU 15 with the system configuration diagram. That is, an overall mechanism which extends from the steering wheel 2 to the respective tires 10 and transmits the steering force of the steering wheel 2 is shown in FIG. 1.

Figure 2:
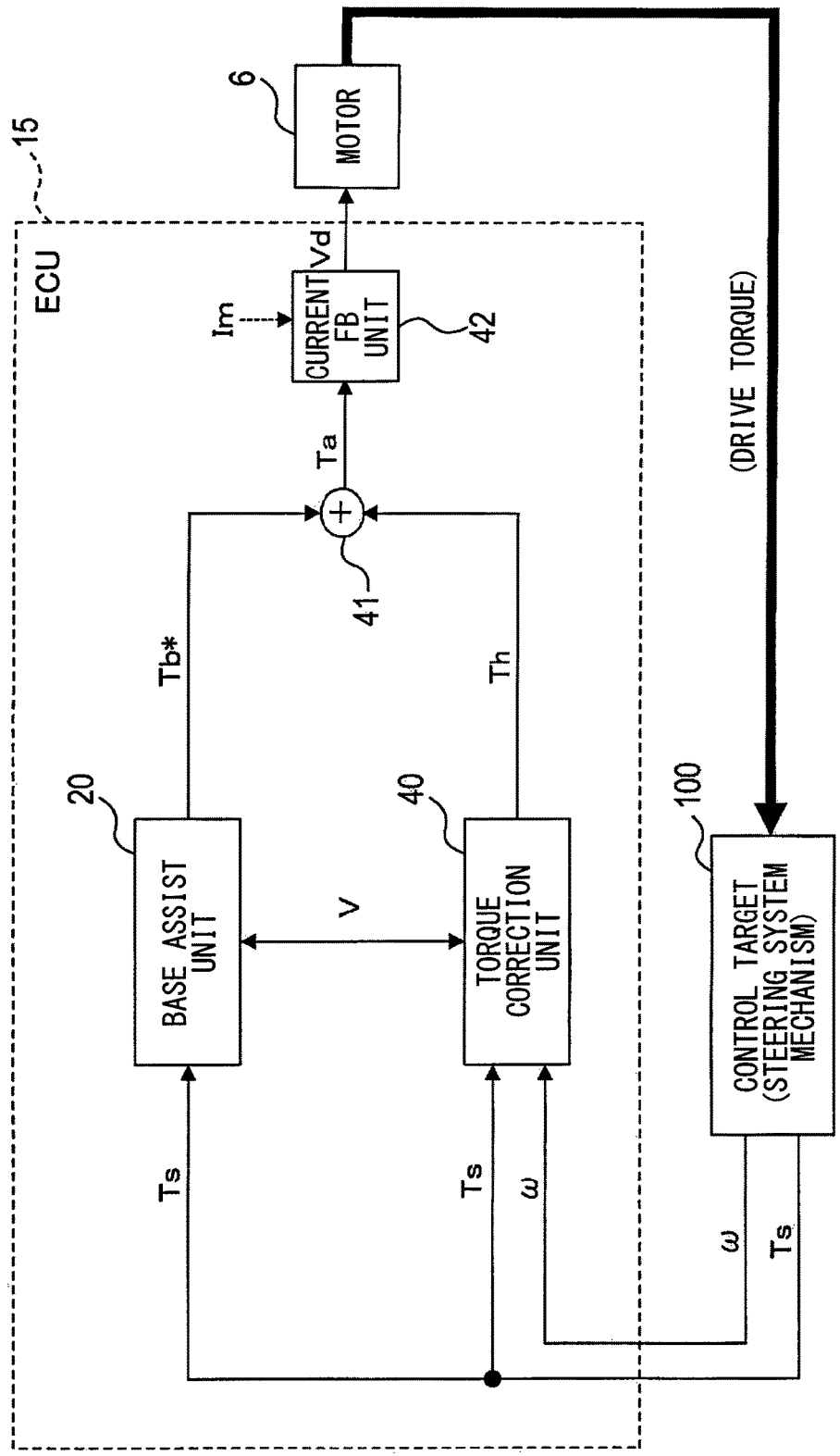
FIG. 2 is a diagram illustrating a schematic configuration of a control mechanism of an ECU.

A schematic configuration (control mechanism) of the ECU 15 is illustrated in a block diagram of FIG. 2. In the control mechanism of the ECU 15 illustrated in FIG. 2, the respective units except for a current feedback (FB) unit 42, and a part of functions of the current FB unit 42 are actually realized with use of CPU (not shown) provided in the ECU 15 and a predetermined control program executed by the CPU.

In other words, various functions realized by the CPU are divided into the respective function blocks in FIG. 2. As an example, the control mechanism illustrated in those respective diagrams is realized by software, and it is needless to say that all or a part of the control mechanism illustrated in FIG. 2 may be realized by hardware such as a logic circuit.

As illustrated in FIG. 2, the ECU 15 includes a base assist unit 20, a torque correction unit 40, an adder 41, and the current feedback (FB) unit 42.

The base assist unit 20 is a block that determines, on the basis of the steering torque Ts and the vehicle speed V, the assist force for assisting the steering force applied to operate the steering wheel by the driver. The base assist unit 20 has a function of adjusting a steering feel transferred to the driver (the weight of the steering wheel, viscosity sense, hysteresis characteristic of rotation or rotation back of the steering wheel, and so on) with a map. The base assist unit 20 generates the assist torque command for realizing the adjusted steering feel to the motor.

A torque correction unit 40 is a block for correcting a vehicle control characteristic for the driver's steering wheel operation and the transmission in the steering mechanical system according to a driver's intention (specifically, the vehicle is properly converged, the vehicle turning is smoothed, and so on). The torque correction unit 40 generates a correction torque command Th for suppressing (converging) the above-mentioned unstable behavior on the basis of the steering torque Ts, the motor speed ω, and the vehicle speed V.

The adder 41 adds a base assist command Tb* generated in the base assist unit 20 and correction torque command Th generated in the torque correction unit 40 to generate the assist torque command Ta.

The current FB unit 42 applies the drive voltage Vd to the motor 6 so that an assist torque (assist steering force) corresponding to the assist torque command Ta is supplied to the steering shaft (particularly, to the side close to the tires 10 with reference to the torque sensor 4). Specifically, a target current (target current for each phase) to be supplied to each phase of the motor 6 is set on the basis of the assist torque command Ta. The supply current Im of each phase is detected and fed back, and the drive voltage Vd is controlled (supply current Im is controlled) so that a detection value (supply current Im of each phase) of the supply current Im becomes equal to each target current, to thereby generate a desired assist torque for the steering shaft.

Because the torque correction unit 40 and the current FB unit 42 are known techniques (for example, refer to JP 2013-52793 A), their description will be omitted, and the base assist unit 20 involved in a main part of the present disclosure will be described in detail below.

Figure 3:
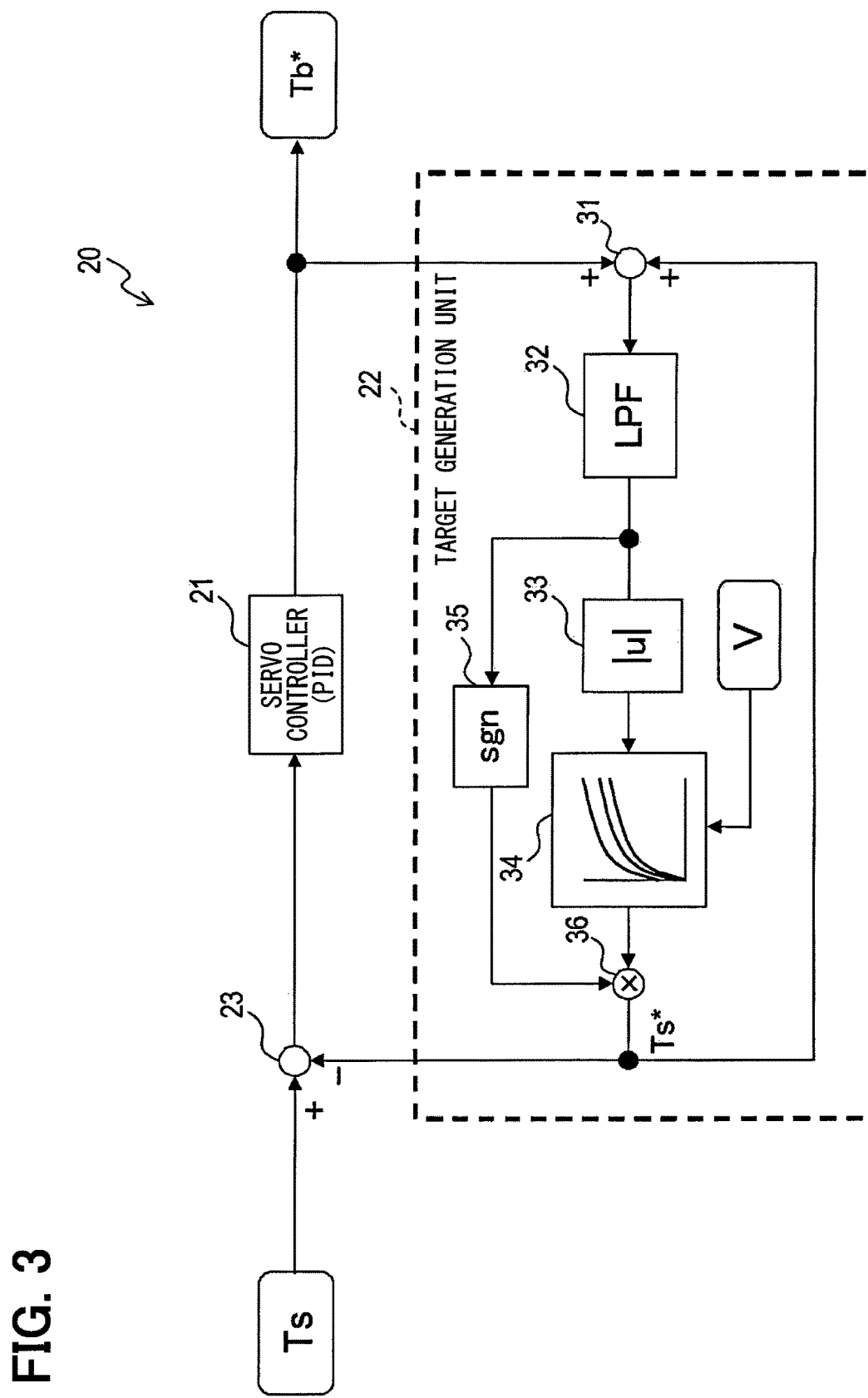
FIG. 3 is a diagram illustrating a schematic configuration of a base assist unit according to a first embodiment.

As illustrated in FIG. 3, the base assist unit 20 includes a servo controller 21, a target generation unit 22, and a deviation calculator 23. In other words, the base assist unit 20 generates the base assist command Tb* so as to obtain the suitable steering torque Ts with consideration of (feeding back) the currently output base assist command Tb*. The target generation unit 22 generates a target steering torque Ts* as a target value of the steering torque on the basis of the base assist command Tb* and a travel speed (vehicle speed V) of the subject vehicle. The deviation calculator 23 calculates a torque deviation (Ts−Ts*) that is a difference between the steering torque Ts and the target steering torque Ts*. The servo controller 21 is configured as a known PID controller having a proportioner, an integrator, and a differentiator. In order to generate stable assist steering force while feeding back a state output by the servo controller 21, the servo controller 21 generates the base assist command Tb* indicative of an assist steering force (assist torque or assist amount) so that the torque deviation (difference between the steering torque Ts and the target steering torque Ts*) decreases close to zero. Herein, the torque deviation which is the difference between the steering torque Ts and the target steering torque Ts* decreases close to zero also includes that the torque deviation is decreased smaller than a predetermined threshold. The target generation unit 22 corresponds to a steering target value generation unit, the servo controller 21 and the deviation calculator 23 correspond to a command value generation unit, and the current FB unit 42 corresponds to a motor drive unit.

In the above configuration, the target generation unit 22 includes an adder 31, a low-pass filter (LPF) 32, an absolute value generator (|u|) 33, a torque converter 34, a sign determiner (sgn) 35, and a multiplier 36.

The adder 31 adds the base assist command Tb* and the target steering torque Ts* together to obtain a road surface reaction force. The low-pass filter 32 is set to attenuate a frequency band higher than an operation frequency band (generally, up to 10 Hz) operated by the driver. The low-pass filter 32 has, for example, a function of attenuating disturbance and noise of a resonant frequency (for example, about 14 Hz) specific to a steering device (steering system mechanism 100).

The absolute value generator 33 receives the road surface reaction force (Ts*+Tb*) that passes through the low-pass filter 32, and outputs an absolute value of the road surface reaction force. The torque converter 34 outputs an absolute value |Ts*| of the target steering torque corresponding to the road surface reaction force according to a torque map indicative of a relationship between the absolute value |Ts*+Tb*| of the road surface reaction force and the target steering torque Ts*. The sign determiner 35 extracts a sign of the road surface reaction force (Ts*+Tb*) from an output of the low-pass filter 32. The multiplier 36 outputs a result obtained by multiplying the absolute value |Ts*| of the target steering torque output from the torque converter 34 by the sign extracted by the sign determiner 35 as the target steering torque Ts*.

Figure 4:
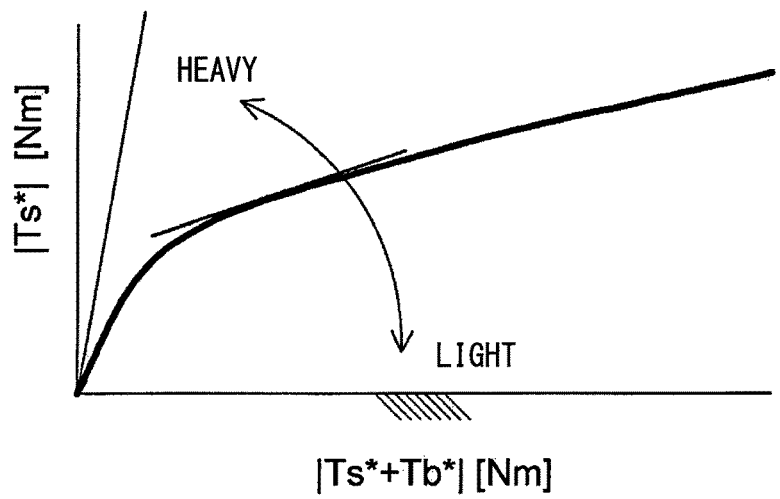
FIG. 4 is an exemplary diagram of a torque map for setting a target steering torque.

In the above configuration, as illustrated in FIG. 4, the torque map used in the torque converter 34 is set to monotonically increase the absolute value |Ts*| of the target steering torque according to an increase in the absolute value |Ts*+Tb*| of the road surface reaction force. In particular, an increase in the absolute value |Ts*| of the target steering torque is set to be larger in a region where the absolute value |Ts*+Tb*| of the road surface reaction force is smaller, and the increase in the absolute value |Ts*| of the target steering torque is set to be smaller in a region where the absolute value |Ts*+Tb*| of the road surface reaction force is larger.

FIG. 4 illustrates a single characteristic. In actual use, different characteristics defined according to the vehicle speed V are prepared, and the characteristics are set to have a tendency that the absolute value |Ts*| of the output target steering torque increases according to an increase in the vehicle speed.

Figure 5:
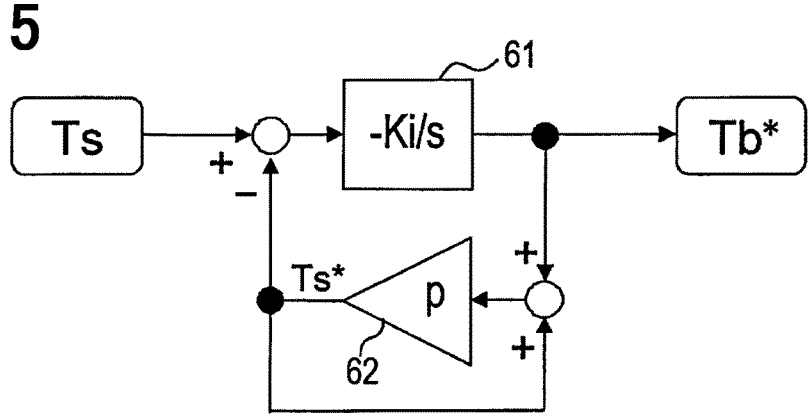
FIG. 5 is a diagram illustrating a simplified configuration of the base assist unit.

In the above configuration, for helping the understanding of the characteristic of the base assist unit 20, a simplified configuration of the base assist unit 20 illustrated in FIG. 3 is shown in FIG. 5. In other words, in FIG. 5, the filter (LPF 32) in the target generation unit 22 and the proportioner and the differentiator in the servo controller 21 are omitted. Symbol Ki indicates an integration constant of the integrator configuring the servo controller 21.

In the above configuration, the following Expressions [1] to [3] are satisfied. Symbol p is indicative of an operating point gradient in a conversion map (refer to FIG. 4).

$$\begin{cases} Tr = (TB^* + Ts^*)p & [1] \\ Tb^* = (Ts^* - Ts) \times (-Ki/s) & [2] \end{cases}$$

From Expressions [1] and [2], $$Tb^* = \frac{Ki}{s + k * Ki} Ts \qquad [3]$$

Herein, p=k/(1−k).

It is found from the above Expression [3] that the base assist unit 20 has the characteristic of a first-order low-pass filter.

Figure 6:
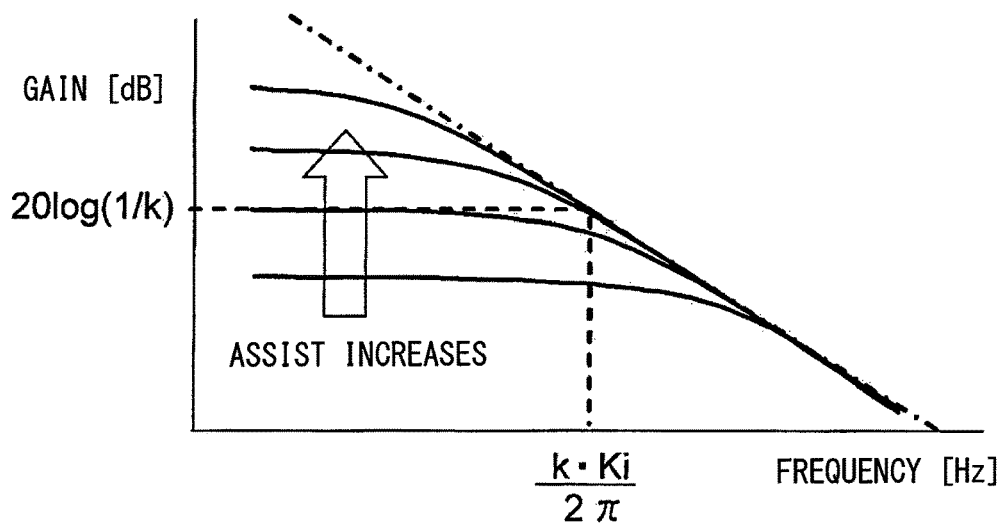
FIG. 6 is a graph illustrating an assist characteristic (transmission characteristic from a steering torque to a base assist command) in relation to a frequency.

According to the base assist unit 20 described above, the transmission from the steering torque Ts to the base assist command Tb* is illustrated in FIG. 6. That is, the transmission has a characteristic that a gain within a low frequency band increases with an increase of the assist. The transmission has a characteristic that a gain within a high frequency band does not change even though the assist increases and the gain decreases in a frequency range higher than a break point ((k*Ki)/2π). As illustrated in FIG. 6, the band is lowered as the assist increases.

In other words, it is found that the gain of the servo controller (integrator having a property that a gain increases with a decrease of the frequency) is limited by feeding back the base assist command Tb*, and the limit value (upper limit) is lowered according to an increase in the operating point gradient p (=k/(1−k)). Herein, the increase in the operating point gradient corresponds to an increase in the target steering torque gain k. When the proportioner and the differentiator are provided, the gain is also generated in the high frequency. However, in the present embodiment, the gain is increased or decreased only within the low frequency band by limiting the feedback information to the low frequency.

In the actual target generation unit 22, a low frequency component of the road surface reaction force Ts*+Tb* that passes through the LPF 32 has a characteristic set by the torque converter 34.

Figure 7:
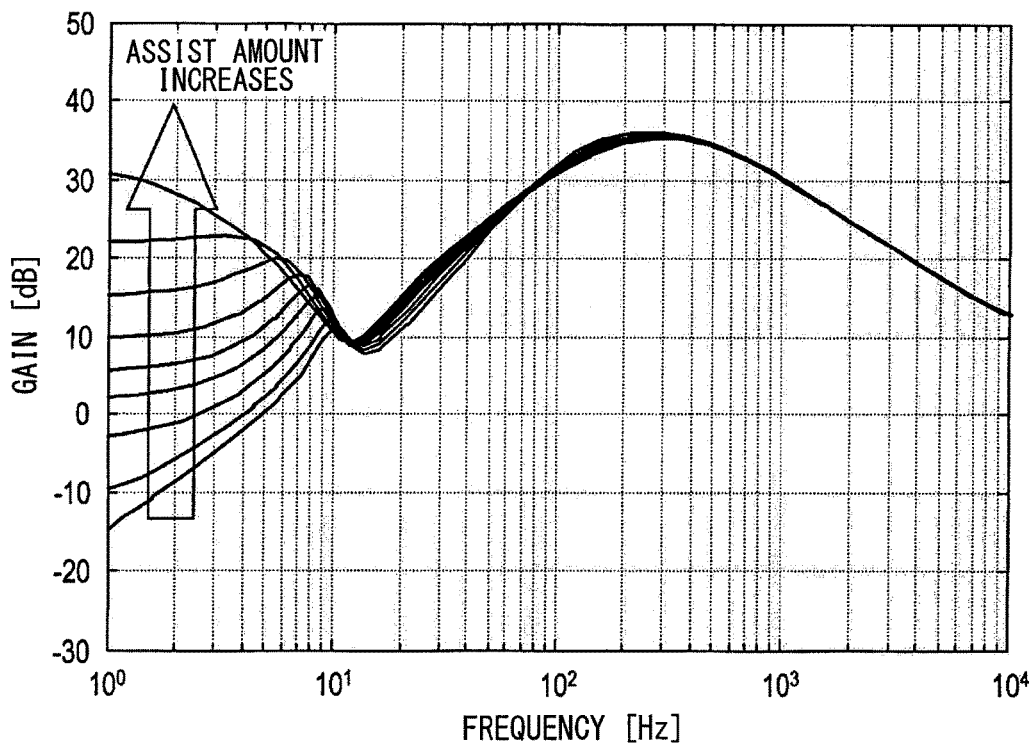
FIG. 7 is a graph illustrating the transmission characteristic from the steering torque to the base assist command.
Figure 8:
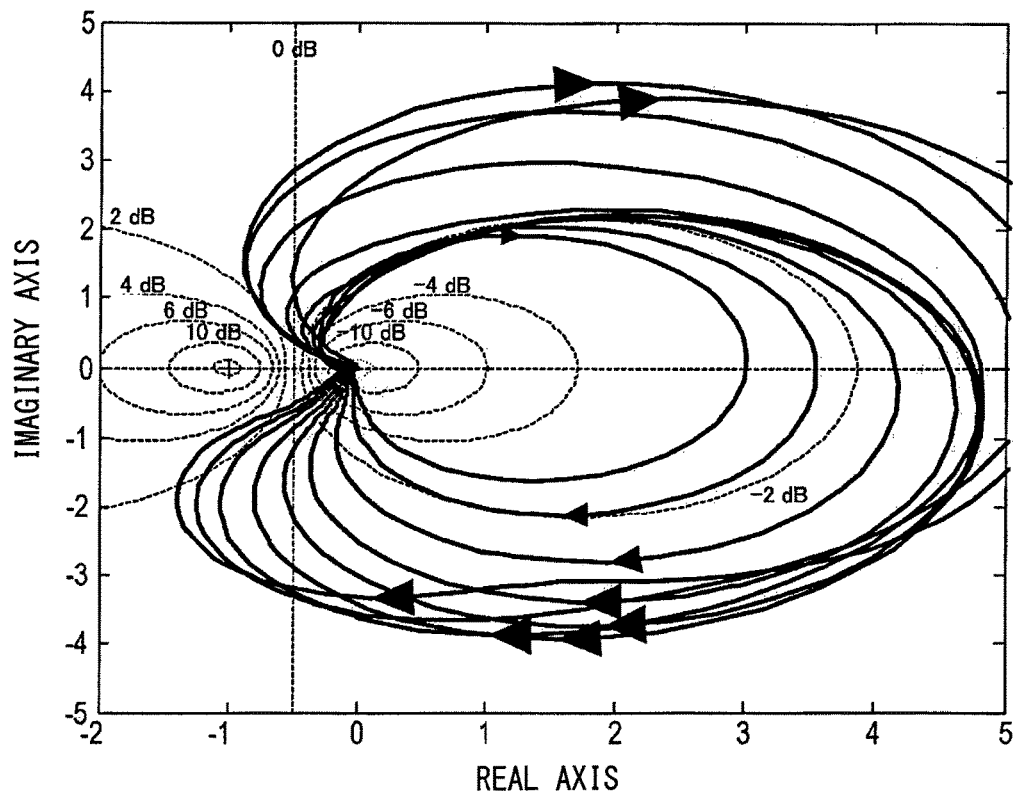
FIG. 8 is a graph illustrating a steering torque open loop characteristic (Nyquist diagram)

Results obtained by analyzing the characteristic by the base assist unit 20 with use of a model imitating the steering system mechanism are illustrated in FIGS. 7 and 8. Herein, the target steering torque gain k is changed from about 0.05 to about 4. FIG. 7 is a graph illustrating the gain characteristic of the steering torque and the assist torque, and FIG. 8 is a Nyquist diagram illustrating an open loop characteristic of the steering torque.

As the characteristic of the feedback has already been described above, in FIG. 7, when a cutoff frequency of the low-pass filter 32 is set to 10 Hz, the gain increases dramatically with a decrease of the target steering torque gain k in the frequency band lower than about 10 Hz, and the gain nearly not changes in the frequency band higher than about 10 Hz.

In addition, in the stability of the system, since a critical point (coordinates (−1, 0)) is avoided even if the assist amount is increased as illustrated in the Nyquist diagram in FIG. 8, it is found that a closed loop system is stable. Herein, the closed loop system detects the steering torque of the control target to generate the assist torque for the motor through the base assist unit 20 and the current FB unit 42. In other words, in the electric power steering system 1 according to the present embodiment, only the characteristic of the low frequency band in which the steering feel is to be adjusted is changed without changing the characteristic of the frequency band higher than the resonant frequency of the steering system which contributes to the stability even if the assist amount is increased or decreased. With this configuration, the driver can freely adjust the steering feel without considering the stability of the control system when adjusting the steering feel.

As described above, in the present embodiment, the road surface reaction force (Ts*+Tb*) is obtained according to an expected value (target steering torque) Ts* of the steering torque and a command value (base assist command) Tb* of the assist torque, and the target steering torque Ts* following the servo controller 21 is generated with the use of the road surface reaction force. In other words, because the steering torque Ts and the supply current Im on which the noise is likely to be superimposed are not used in generation of the target steering torque Ts, the target steering torque Ts* can be restrained from being affected by the noise, and unnecessary vibration can be restrained from being generated due to the control using the target steering torque Ts*. In other words, the robustness to the noise in the steering system can be improved according to the present embodiment.

In addition, in the present embodiment, because the target steering torque Ts* regarded as the expected value of the steering torque is used in obtaining the road surface reaction force, the responsiveness of the control can be improved as compared with a case of using the steering torque Ts indicative of the result caused by the driver's operation.

Further, in the present embodiment, the target steering torque Ts* used in the control of the servo controller 21 is obtained according to the road surface reaction force that is a fundamental factor for determining the weight of the steering. For that reason, when adjusting the steering characteristic, the driver can perform adaptation using an indication showing what kind of steering torque characteristic is expected to be realized for the road surface reaction force (road surface load). Thus, the indication is easily understandable in a sensible way to the driver.

In the present embodiment, for the road surface reaction force used in generation of the target steering torque Ts*, the gain characteristic of the frequency higher than the operation frequency band (generally, up to 10 Hz) operated by the driver is attenuated with the use of the LPF 32. Thus, the noise of the high frequency band can be removed without adversely affecting the steering feel.

According to the electric steering control device of the present embodiment, the vibration of the control system, which is generated when the control of the motor is affected by the noise included in the sensor, can be suppressed. In particular, no noise is superimposed on the assist torque that is one of the signals used for estimating a state amount (for example, the road surface reaction force) when the command value of the assist torque is used. Thus, compared with a case in which the assist torque obtained from the detected torque current is used, the adverse effect of the noise can be further suppressed. In addition, since the target value of the steering torque is not the result caused by the driver's operation but the expected value, the control based on the target value of the steering torque is a proactive control, and the responsiveness of the control can be improved.

In addition, in the present embodiment, the state amount used in generation of the target value of the steering torque can be converted into a physical quantity indicative of a rotation movement of a vehicle such as a horizontal acceleration of the vehicle or a yaw rate of the vehicle in addition to the road surface reaction force. Because those state amounts can be intuitively sensible by the driver, the steering feel (that is, the conversion characteristic from the state amount into the target value of the steering torque) can be adjusted intuitively by the driver.

Second Embodiment

A basic configuration of a second embodiment is similar to the first embodiment, and therefore common configurations will be omitted from a description, and differences will be mainly described.

In the first embodiment described above, the torque converter 34 uses the road surface reaction force Ts*+Tb* in obtaining of the target steering torque Ts*. The second embodiment is different from the first embodiment in that a horizontal acceleration, which is obtained from the road surface reaction force Ts*+Tb*, is used in obtaining of the target steering torque Ts*.

The present embodiment is different from the first embodiment only in the configuration of the base assist unit, particularly, partial configuration of the target generation unit.

Figure 9:
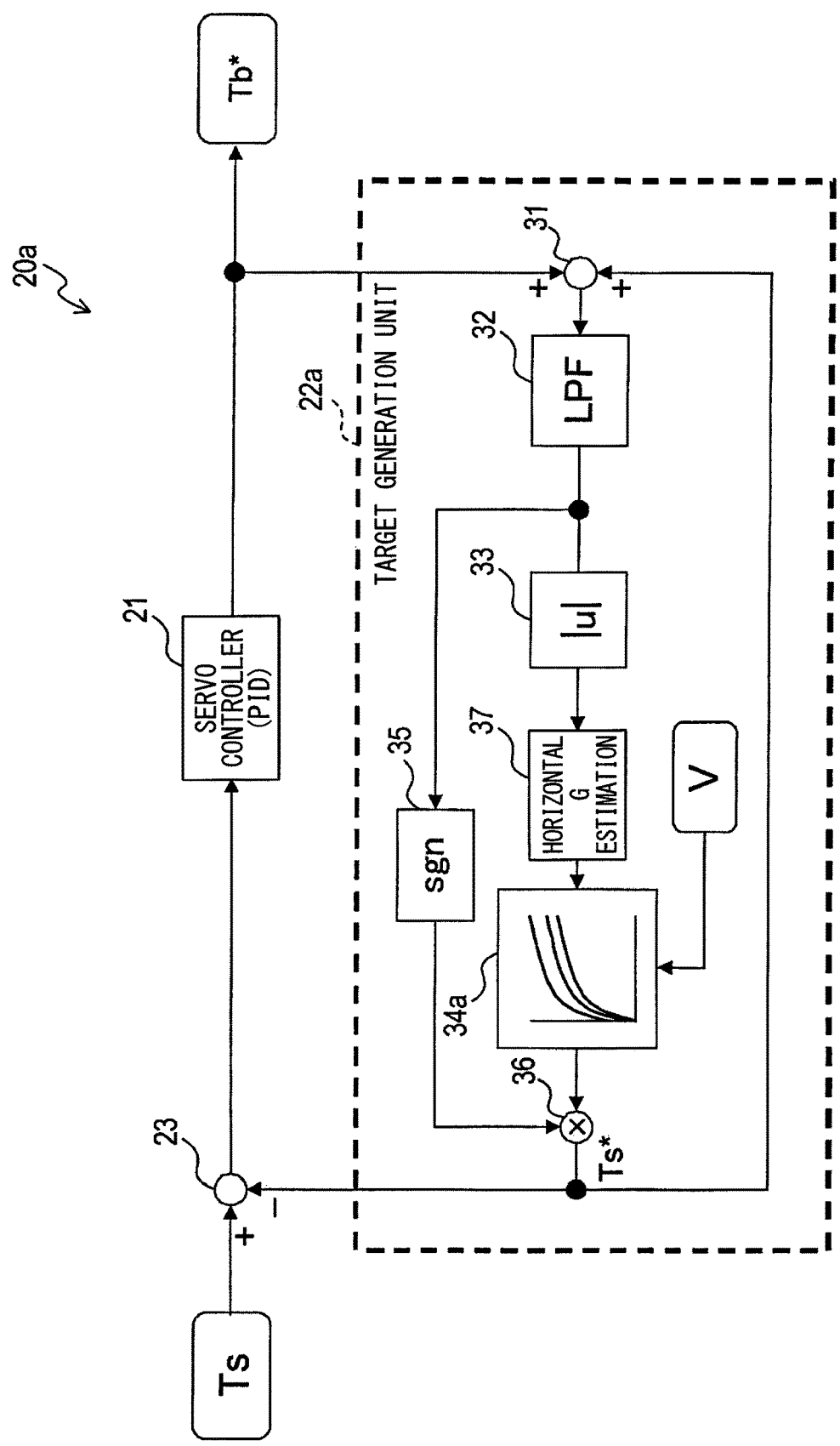
FIG. 9 is a diagram illustrating a schematic configuration of a base assist unit according to a second embodiment.

In a base assist unit 20a according to the present embodiment, as illustrated in FIG. 9, a target generation unit 22a is different from the target generation unit 22 illustrated in FIG. 3 in that a torque converter 34a is provided instead of the torque converter 34, and a horizontal acceleration (horizontal G) estimation unit 37 is inserted between an absolute value generator 33 and the torque converter 34a. The target generation unit 22a corresponds to a steering target value generation unit.

Figure 10:
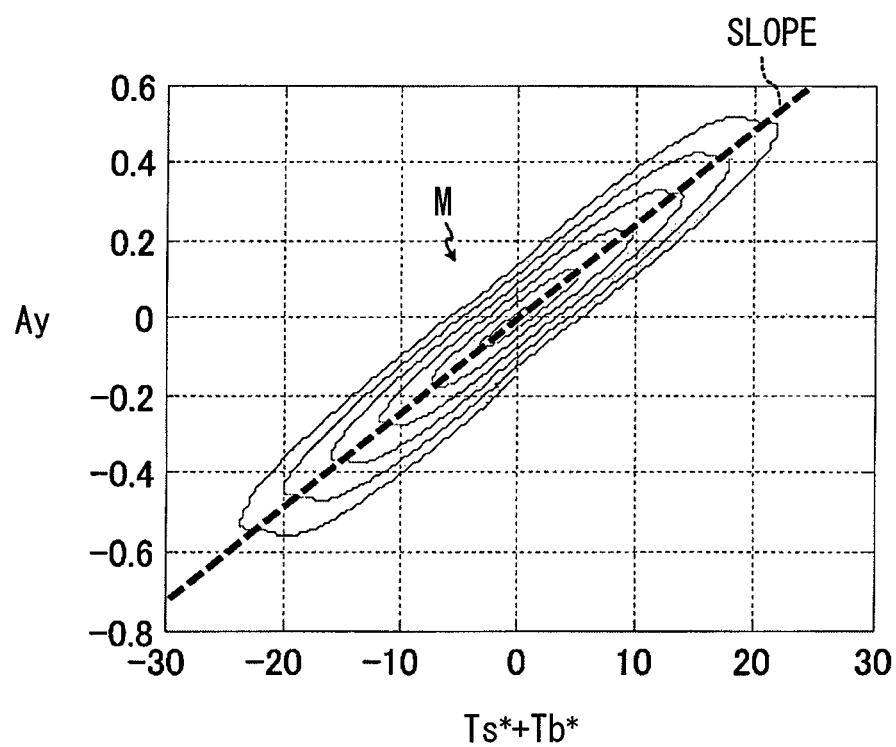
FIG. 10 is an illustrative view of a conversion coefficient for converting a road surface reaction force into a horizontal acceleration.

The horizontal G estimation unit 37 obtains a horizontal acceleration Ay applied to a vehicle by multiplying an output of the absolute value generator 33 by a predetermined conversion coefficient Ktrns. For example, the conversion coefficient Ktrns is defined based on a slope of a graph which is obtained by approximating a measurement result M using a linear function (straight linear graph) as illustrated in FIG. 10. Herein, the measurement result M is obtained by measuring road surface reaction force Ts*+Tb* and the horizontal acceleration Ay in a driving test.

The torque converter 34a obtains an absolute value |Ts*| of a target steering torque according to an absolute value |Ay| of the horizontal acceleration with the use of a torque map in which a relationship between a road surface reaction force and a steering torque illustrated in FIG. 10 is converted into a relationship between the horizontal acceleration and the steering torque.

According to the second embodiment described in detail above, the following advantages can be obtained in addition to the advantages of the first embodiment described above.

According to the present embodiment, the steering torque, and a steering feel can be adjusted on the basis of the horizontal acceleration of the vehicle which is directly perceived by the driver during steering operation, instead of the road surface reaction force.

Other Embodiments

The embodiments of the present disclosure have been described above. However, the present disclosure is not limited to the above embodiments, but can be variously modified as follows.

In the above embodiments, the LPF 32 is disposed between the adder 31 and the torque converter 34. However, the present disclosure is not limited to the above configuration. For example, the LPF 32 may be disposed to act on the target steering torque Ts* and the base assist command Tb* which are to be added to the adder 31.

Each of the above embodiments includes the torque correction unit 40. Alternatively, the torque correction unit 40 may be omitted.

In the above embodiments, when obtaining the road surface reaction force, the base assist command Tb* is used. Alternatively, the assist torque obtained from the supply current Im may be used to obtain the road surface reaction force.

In the above second embodiment, the horizontal acceleration is obtained according to the road surface reaction force, but the present disclosure is not limited to the above configuration, and other physical quantities that can be estimated from the steering torque and the assist torque can be applied. For example, a yaw rate may be used instead of the horizontal acceleration.

The present disclosure can be realized in various forms, such as a system which has the electric steering control device as a component, a program for functioning a computer as the base assist unit of the electric steering control device, a medium which records the program, or a method of generating the assist torque, in addition to the above-described electric steering control device.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. An electric steering control device controlling a steering characteristic by outputting an assist torque using a motor, the assist torque corresponding to a steering torque applied to a steering shaft, the electric steering control device comprising:
    a steering target value generation unit estimating a road surface reaction force based on a sum of a target value of the steering torque and the assist torque, and generating a new target value of the steering torque based on a function indicative of a relationship between the road surface reaction force and the target value of the steering torque;
    a command value generation unit generating a command value for controlling the motor to reduce a deviation between the target value of the steering torque and the steering torque applied to the steering shaft to a level lower than a predetermined threshold; and
    a motor drive unit driving the motor based on the command value.

2. An electric steering control device controlling a steering characteristic by outputting an assist torque using a motor, the assist torque corresponding to a steering torque which is applied to a steering shaft, the electric steering control device comprising:
    a steering target value generation unit estimating a road surface reaction force based on a sum of a target value of the steering torque and the assist torque, calculating a physical quantity indicative of a rotation movement of a vehicle by multiplying the road surface reaction force by a predetermined conversion coefficient, and generating a new target value of the steering torque based on a function indicative of a correspondence relationship between the physical quantity and the target value of the steering torque;
    a command value generation unit generating a command value for controlling the motor to reduce a deviation between the target value of the steering torque and the detection value of the steering torque to a level lower than a predetermined threshold; and
    a motor drive unit driving the motor based on the command value.

3. The electric steering control device according to claim 2, wherein
    the physical quantity is a horizontal acceleration of the vehicle.

4. The electric steering control device according to claim 2, wherein the physical quantity is a yaw rate of the vehicle.

5. The electric steering control device according to claim 1, wherein
    the function varies with speed.

* * * * *